United States Patent [19]
Lee et al.

[11] Patent Number: 6,088,031
[45] Date of Patent: Jul. 11, 2000

[54] METHOD AND DEVICE FOR CONTROLLING SELECTION OF A MENU ITEM FROM A MENU DISPLAYED ON A SCREEN

[75] Inventors: Young-Soon Lee, Suwon; Ju-Ha Park, Yongin, both of Rep. of Korea

[73] Assignee: Samsung Electronics Co., Ltd., Suwon, Rep. of Korea

[21] Appl. No.: 09/032,992

[22] Filed: Mar. 2, 1998

[30] Foreign Application Priority Data

Jul. 21, 1997 [KR] Rep. of Korea ............... 97-33962

[51] Int. Cl.⁷ .................................................. G06F 3/00
[52] U.S. Cl. ...................... 345/352; 345/333; 345/146
[58] Field of Search ................................. 345/352, 146, 345/354, 339, 357, 333; 348/564, 565, 589

[56] References Cited

U.S. PATENT DOCUMENTS

| | | | |
|---|---|---|---|
| 4,823,283 | 4/1989 | Diehm et al. | 345/352 |
| 5,179,653 | 1/1993 | Fuller | 345/354 |
| 5,384,910 | 1/1995 | Torres | 345/352 |
| 5,543,857 | 8/1996 | Wehmeyer et al. | 348/589 |
| 5,596,699 | 1/1997 | Driskell | 345/352 |
| 5,757,358 | 5/1998 | Osga | 345/146 |
| 5,808,604 | 9/1998 | Robin | 345/146 |

*Primary Examiner*—Matthew M. Kim
*Assistant Examiner*—Tadesse Hailu
*Attorney, Agent, or Firm*—Staas & Halsey LLP

[57] ABSTRACT

A method and device for controlling a selection of the menu displayed on a screen of a TV or PC using a pointing device. The method includes the steps of apportioning the screen for a plurality of menu fields each to include a specified area surrounding a respective menu item, and enabling the menu item included in one of the menu fields indicated by the pointer of the pointing device to be selected.

19 Claims, 5 Drawing Sheets

METHOD AND DEVICE FOR CONTROLLING SELECTION OF A MENU ITEM FROM A MENU DISPLAYED ON A SCREEN

BACKGROUND OF THE INVENTION

1. Field of the Invention

The present invention relates to a TV or PC, and more particularly, to a method of controlling selection of a menu item of a menu displayed on the screen of a TV or PC using a pointing device, and a device thereof.

2. Description of the Related Art

Generally, TV sets or personal computers display menus corresponding to various functions on display screens by means of OSD (On Screen Display) to help a user to easily understand and use the functions of TV sets or computers. In most cases, the new items of menus displayed on the screen can be selected by the user using a pointing device. Such pointing devices are, for example, a mouse, a joystick, a trackball, and a digitizer, etc.

When selecting a menu item by a pointing device, the user positions the cursor on a desired menu item indicating a relevant function by manipulating the pointing device, whereupon the function is activated/performed by clicking a button on the pointing device or pressing the enter key on the keyboard. Since it is difficult to position the pointer of the pointing device directly on the correct position of the desired menu item, in most cases the user must adjust the pointer several times to the correct position. Also, there are frequent occasions when the pointing position is deflected from the menu item during pressing the entry key because the pointing device is moved by the user's hand, which creates difficulties in menu item selections for the user.

As mentioned above, it is inconvenient for the user to select menu items since it is difficult to position the pointer of the pointing device correctly on the desired menu items.

SUMMARY OF THE INVENTION

Accordingly it is an object of the present invention to provide a method of controlling the selection of menu items from a menu displayed on the screen of a TV, using a pointing device so as to conveniently and easily select the menu items.

Additional objects and advantages of the invention will be set forth in part in the description which follows and, in part, will be obvious from the description, or may be learned by practice of the invention.

According to the present invention, a method of controlling the selection of menu items from a menu displayed on the screen of a TV or PC using a pointing device includes the steps of apportioning the screen for a plurality of menu fields each to include a specified area surrounding a menu item, and enabling the menu item included in one of the menu fields indicated by the pointer of the pointing device to be selected.

BRIEF DESCRIPTION OF THE DRAWINGS

The present invention will now be described more specifically with reference to the drawings attached only by way of example.

DETAILED DESCRIPTION OF THE PREFERRED EMBODIMENT

Figure 1:
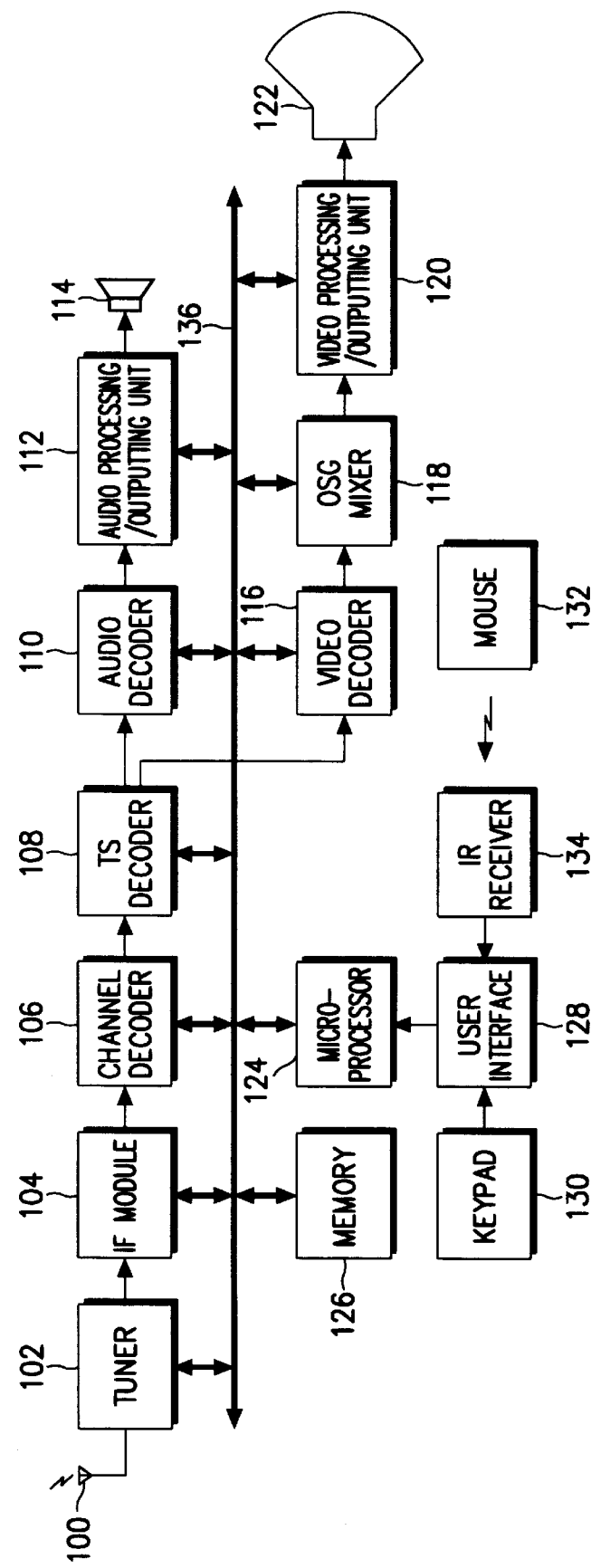
FIG. 1 is a block diagram of an HDTV (High Definition Television) receiver adopting the MPEG (Moving Picture Expert Group) standard according to an embodiment of the present invention.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Referring to FIG. 1, a tuner 102 selects an RF channel from signals received through an antenna 100 under the control of a microprocessor 124. The tuner 102 generates an IF (Intermediate Frequency) signal of the selected channel, the IF signal is converted into a baseband signal by an IF module 104, and the baseband signal is delivered to a channel decoder 106. Thereupon, the channel decoder 106 converts the baseband signal received from the IF module 104 to a channel signal to reconstruct data bit strings. The reconstructed data bit strings are separated into audio data, video data, and auxiliary data by a TS (Transport Stream) decoder 108.

The above audio data are delivered to an audio decoder 110 so as to be decoded in accordance with the MPEG standard or the Dolby AC-3 standard, whereupon the resulting signals are processed by an audio processing/outputting unit 112 so as to be output as audible sound through a speaker 114. The video data are delivered to a video decoder 116 so as to be decoded in accordance with the MPEG standard, whereby the resulting signal is applied to an OSG (On Screen Graphic) mixer 118 to be mixed with OSG data under the control of a microprocessor 124 and then processed by a video processing/outputting unit 120. The video processed data is displayed on the screen of a picture tube 122. The OSG data are used for displaying various information in the form of graphic and text on the screen under the control of the microprocessor 124. The auxiliary data are supplied to the microprocessor 124.

The microprocessor 124, as the controller of the HDTV set, is connected with a keypad 130 and an IR (infrared) receiver 134 through a user interface 128. The microprocessor 124 performs operations based on commands input from the keypad 130 and the mouse 132 via the IR receiver 134 according to the program stored in the memory 126. The mouse 132 is a cordless mouse and is one of the pointing devices mentioned above. Pointing signals are produced by moving the mouse 132 itself or through the key entries by the user, thereby being transmitted by radio. Usually, the cordless mouse employs an IR signal. The IR signals transmitted from the mouse 132 are received by the IR receiver 134 and further supplied to the microprocessor 124 through the user interface 128.

The memory 126 includes a ROM (Read Only Memory) for storing the program of the microprocessor 124, a RAM (Random Access Memory) for temporarily storing data resulting from the program execution of the microprocessor 124, and an EEPROM (Electrically Erasable and Programmable ROM) for storing various reference data.

The above tuner 102, IF module 104, channel decoder 106, TS decoder 108, audio decoder 110, audio processing/outputting unit 112, video decoder 116, OSG mixer 118, video processing/outputting unit 120, and memory 126 are connected with the microprocessor 124 through a bus 136.

Figure 2:
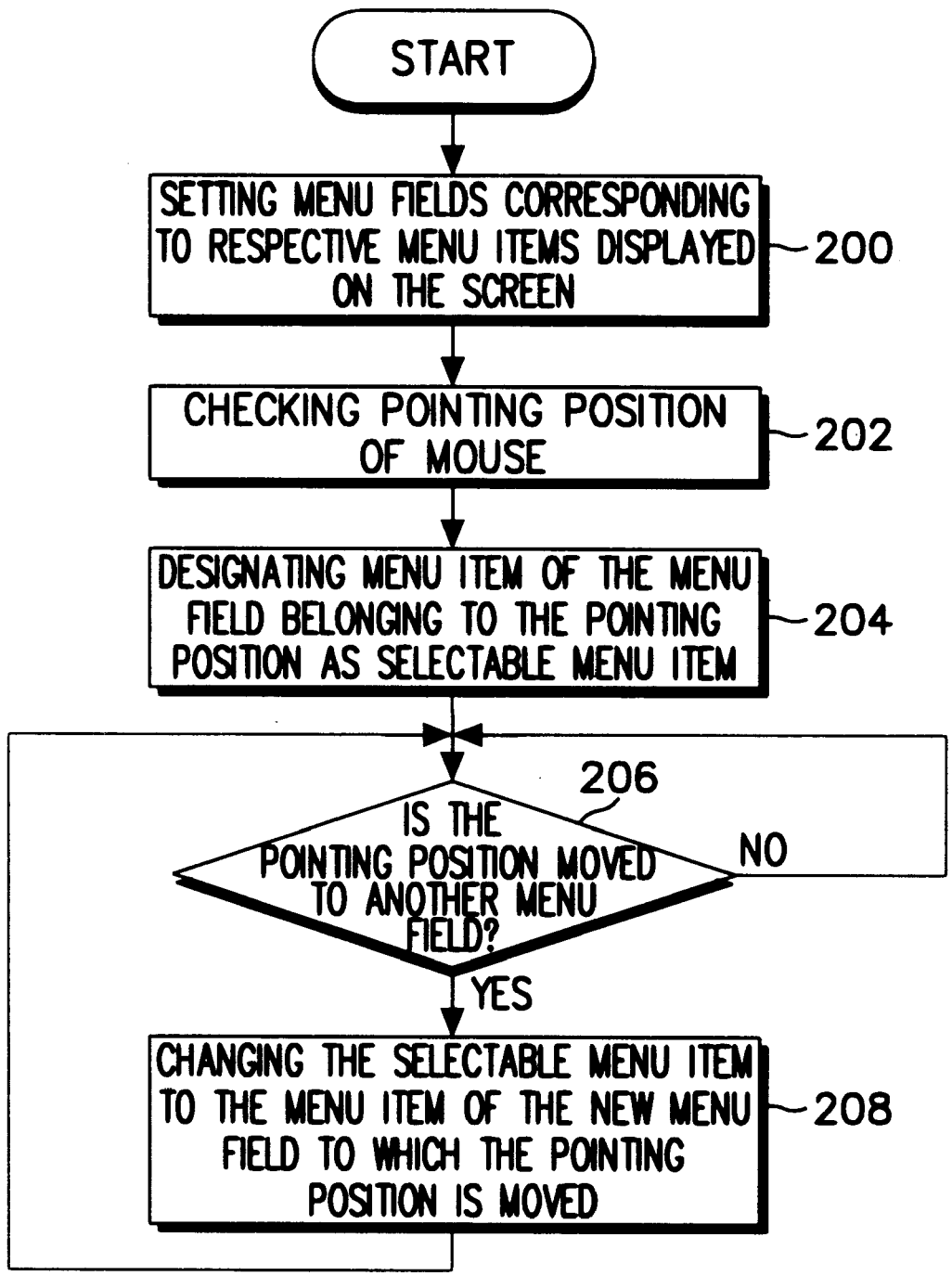
FIG. 2 is a control flowchart illustrating a menu selection of a number from a menu according to the embodiment of the present invention.

FIG. 2 is a flowchart of a control process performed by the microprocessor 124 when the inventive method of the present invention is applied to the menu item selection on the HDTV set as shown in FIG. 1 using a mouse 132. Therefore, the functions to be performed by the microprocessor 124 according to the flowchart of FIG. 2 are programmed and stored in the memory 126.

Referring to FIG. 2, when a menu window is displayed, in step 200 the microprocessor 124 apportions the screen for a plurality of menu fields each including a specified area surrounding each menu item without overlapping the adjacent menu fields.

Figure 4A:
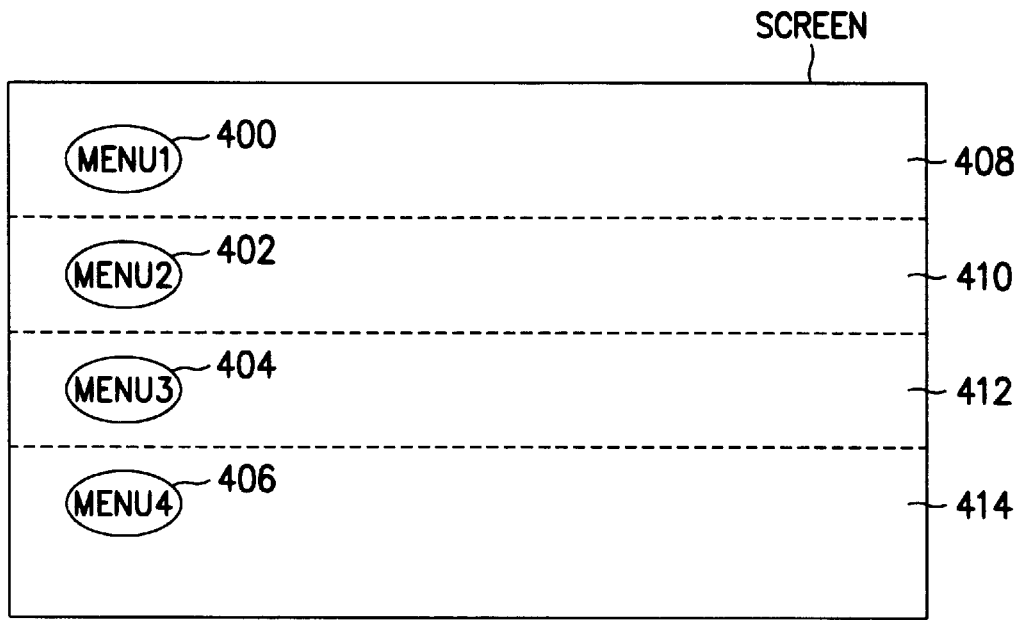
FIGS. 4a and 4b are diagrams for illustrating a screen apportioned for a plurality of menu fields according to the embodiment of the present invention.
Figure 4B:
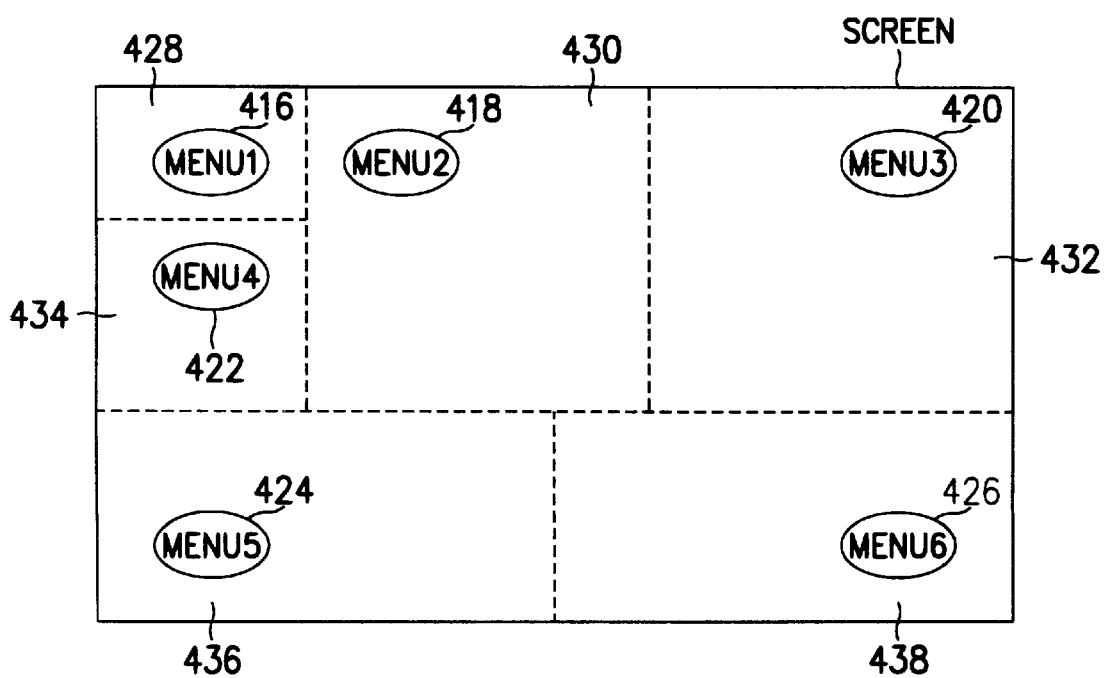
Figure 5:
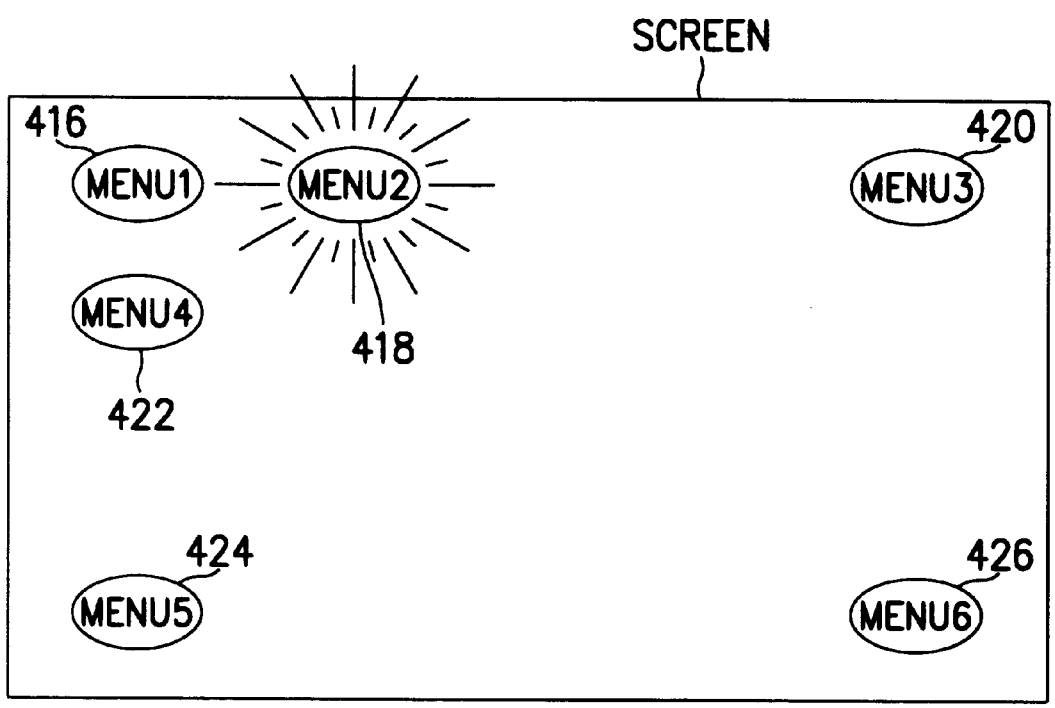
FIG. 5 is an illustrative diagram of the screen according to the operation of the embodiment of the present invention.

FIG. 4a illustrates an example of setting the menu fields 408–414 in the case of displaying four menu items 400–406 vertically arranged on the left side of the screen, whereby the menu fields 408–414 each correspond to the respective menu items 400–406. FIG. 4b illustrates an example of setting the menu fields 428–438 in the case of displaying six menu items 416–426 scattered on the screen, whereby the menu fields 428–438 each correspond to the respective menu items 416–426. Under this state, in step 202 the microprocessor 124 checks the pointer of the mouse 132 and further in step 204 enables the menu item of the menu field including the pointer of the mouse to be selected, thereby highlighting the selected menu item by controlling the OSG mixer 118 as shown in FIG. 5. Thus, the menu item 418 is highlighted when the pointer of the mouse 132 is positioned in the menu field 430 under the state of FIG. 4b.

In steps 206–208, when the pointing position is moved to another menu field (step 206), the microprocessor 124 takes another menu item to which the pointing position is moved as the selectable menu item (step 208).

Under the above state, the user selects a selectable menu item and activates the relevant function in the same way as usual. As a result, even when the user roughly moves the mouse 132, a desired menu item can be readily enabled to be selected, without fail.

Defining the operation mode of controlling the menu item selection according to the present invention as a jump mode while defining the usual mode in which the user selects a menu item by directly moving the cursor of the pointing device to the menu item as a cursor mode, the jump mode can be operated by selecting this mode only when necessary, whereby the selection or cancellation of the jump mode can be performed by means of the keypad 130 or the usual remote controller or the mouse 132.

Besides, the jump mode can be adaptively selected depending on the number of menu items displayed on the screen. That is, since the usual cursor mode may be more convenient than the jump mode when the menu items are displayed in very great numbers, the jump mode can be programmed so as to be automatically selected only when the number of menu items is below a specified number.

Figure 3:
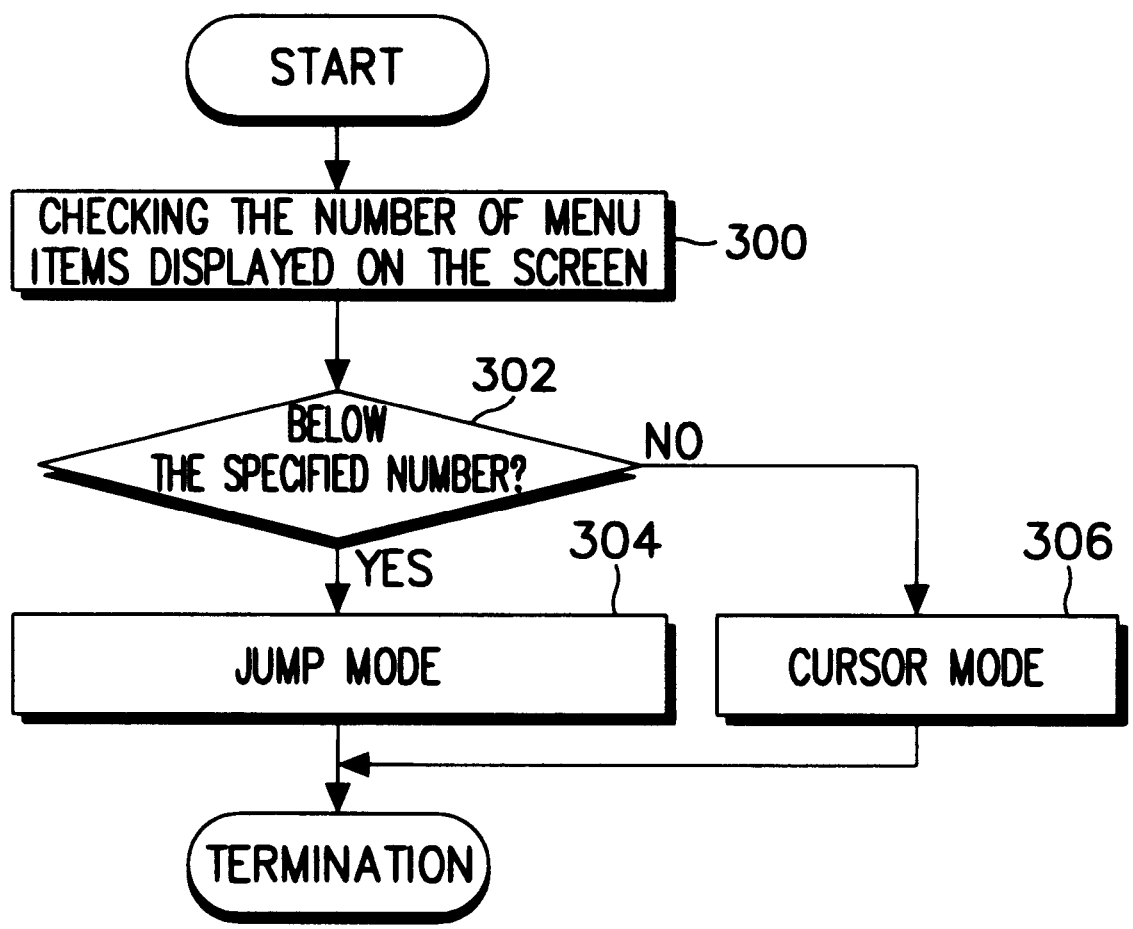
FIG. 3 is a flowchart illustrating a mode selection according to the embodiment of the present invention.

FIG. 3 is a flowchart of selecting modes according to the embodiment of the present invention, illustrating the control process performed by the microprocessor 124 when the inventive method of the present invention is applied to the menu selection on the HDTV set as shown in FIG. 1 using the mouse 132. Therefore, the functions to be performed by the microprocessor 124 according to the flowchart of FIG. 3 are programmed and stored in the memory 126.

Referring to FIG. 3, when a menu window is displayed, at first in step 300 the microprocessor 124 checks the number of the menu items displayed on the screen and proceeds to step 302. When the number of menu items is determined to be below a specified number of menu items in step 302, the jump mode is selected in step 304, whereby the control process is performed according to the flowchart of FIG. 2, and when the number of menu items is above the specified number of menu items, the cursor mode is selected in step 306, whereby the control process is performed in a usual manner.

Thus, the present invention has the advantage that the user can conveniently and easily select the desired menu items using a pointing device. Although the present invention has been described with reference to the specific embodiment, it will be noted that various modifications may be made without departing the gist of the present invention. Particularly, the above embodiment of the present invention shows an example only with respect to an HDTV receiver, but the present invention can be applied to TV receivers of another type and personal computers which select menus using pointing devices. And although the above embodiment employs a mouse as a pointing device, the present invention can also employ other types of pointing devices.

What is claimed:

1. A method of controlling selection of menu items from a menu displayed on a screen of a TV or PC using a pointing device, comprising the steps of:

apportioning the screen for a plurality of menu fields each to include a specified area surrounding a respective one of the menu items; and enabling the menu item included in one of the menu fields indicated by a pointer of the pointing device to be selected.

2. A method as defined in claim 1, wherein the step of apportioning the screen comprises the step of setting menu fields on the screen without overlapping each other.

3. A method as defined in claim 1, wherein the step of enabling comprises the step of highlighting the menu item in the one field indicated by the pointer.

4. A method of controlling selection of menu items from a menu displayed on a screen of a TV or PC using a pointing device, comprising the steps of:

automatically selecting a jump mode when a number of the menu items of the menu is equal to or less than a predetermined number;

apportioning the screen for a plurality of menu fields each to include a specified area surrounding a respective one of the menu items in the jump mode; and enabling the menu item included in one of the menu fields indicated by a pointer of the pointing device to be selected.

5. A method as defined in claim 4, wherein the step of apportioning the screen comprises the step of setting the menu fields on the screen without overlapping each other.

6. A method as defined in claim 4, wherein the step of enabling comprises the step of highlighting the menu item in the one menu field indicated by the pointer.

7. A method of controlling selection of menu items from a menu displayed on a screen of a TV or PC using a pointing device, comprising the steps of:

selecting a jump mode based upon a command from a user;

apportioning the screen for a plurality of menu fields each to include a specified area surrounding a respective one of the menu items in the jump mode; and enabling the menu item included in one of the menu fields indicated by a pointer of the pointing device to be selected.

8. A method as defined in claim 7, wherein the step of apportioning the screen comprises the step of setting the menu fields ont he screen without overlapping each other.

9. A method as defined in claim 7, wherein the step of enabling comprises the step of highlighting the menu item in the one menu field indicated by the pointer.

10. A method of controlling selection of menu items from a menu displayed on a screen through use of a pointing device, the method comprising the steps of:

apportioning the screen into a plurality of menu fields containing respective ones of the menu items in a first mode, wherein each menu field is larger than an area occupied by display of the respective menu item on the screen; and enabling selection of one of the menu items through the pointing device placing a pointer in the respective menu field.

11. The method as claimed in claim 10, further comprising the steps of:

determining a number of the menu items in the menu;

selecting the first mode in response to the number of the menu items being no greater than a predetermined number;

selecting a second mode in response to the number of the menu items being greater than the predetermined number; and apportioning the screen into another plurality of menu fields, each containing respective ones of the menu items and being only as large as the area occupied by display of the respective menu item on the screen, if the second mode is selected.

12. The method as claimed in claim 10, further comprising the steps of:

selecting the first mode or a second mode in accordance with a command from a user; and apportioning the screen into another plurality of menu fields, each containing respective ones of the menu items and being only as large as the area occupied by display of the respective menu item on the screen, if the second mode is selected.

13. A device to enable selection of menu items from a menu through use of a pointer device, comprising:

a screen to display the menu items in the menu; and a processor to apportion the screen into a plurality of menu fields containing respective ones of the menu items in a first mode, wherein each menu field is larger than an area occupied by display of the respective menu item on the screen, and to enable selection of one of the menu items through the pointing device placing a pointer in the respective menu field.

14. The device as claimed in claim 13, wherein the pointing device is a keypad or a mouse.

15. The device as claimed in claim 14, wherein the mouse is an infrared mouse to emit an infrared signal, the device further comprising an infrared receiver to receive the infrared signal from the infrared mouse.

16. The device as claimed in claim 13, wherein the device is a television.

17. The device as claimed in claim 13, wherein the device is a computer.

18. The device as claimed in claim 13, wherein said processor determines a number of the menu items in the menu, selects the first mode in response to the number of the menu items being no greater than a predetermined number, selects a second mode in response to the number of the menu items being greater than the predetermined number, and apportions the screen into another plurality of menu fields each containing respective ones of the menu items and being only as large as the area occupied by display of the respective menu item on the screen if the second mode is selected.

19. The device as claimed in claim 13, further comprising a user interface to receive a command from a user indicative of selection of the first mode or a second mode, wherein said processor apportions the screen into another plurality of menu fields each containing respective ones of the menu items and being only as large as the area occupied by display of the respective menu item on the screen if the second mode is selected by the user.

* * * * *

UNITED STATES PATENT AND TRADEMARK OFFICE
CERTIFICATE OF CORRECTION

PATENT NO. : 6,088,031
DATED : July 11, 2000
INVENTOR(S) : Young-Soon Lee et al.

It is certified that error appears in the above-identified patent and that said Letters Patent is hereby corrected as shown below:

Column 4,
Line 29, "fields" should be -- fields, --;
Line 31, "items; and" should be -- items, based on whether the number of menu items is above a predetermined number; and --;
Line 65, "fields" should be -- fields --;
Line 67, Items in the jump mode; and" should be -- items, based on whether the jump mode is selected; and --;

Column 5,
Line 6, "on the" should be -- on the --;
Line 15, "mode, wherein" should be -- mode based on whether the number of menu items is above a predetermined number, wherein --;
Lines 21-22, "The method as claimed in claim 10, further comprising the steps of:" should be
-- A method of controlling selection of menu items from a menu displayed on a screen through use of a pointing device, the method comprising the steps of:
apportioning the screen into a plurality of menu fields containing respective ones of the menu items in a first mode, wherein each menu field is larger than an area occupied by display of the respective menu item on the screen;
enabling selection of one of the menu items through the pointing device placing a pointer in the respective menu field; --;

Claim 12,
Lines 36-37, "The method as claimed in claim 10, further comprising the steps of:" should be
-- A method of controlling selection of menu items from a menu displayed on a screen through use of a pointing device, the method comprising the steps of:
apportioning the screen into a plurality of menu fields containing respective ones of the menu items in a first mode, wherein each menu field is larger than an area occupied by display of the respective menu item on the screen;
enabling selection of one of the menu items through the pointing device placing a pointer in the respective menu field; --;

UNITED STATES PATENT AND TRADEMARK OFFICE
CERTIFICATE OF CORRECTION

PATENT NO.    : 6,088,031
DATED         : July 11, 2000
INVENTOR(S)   : Young-Soon Lee et al.

It is certified that error appears in the above-identified patent and that said Letters Patent is hereby corrected as shown below:

Column 6,
Line 9, "mode," should be -- mode based on whether the number of menu items is above a predetermined number, --;
Line 24, "The device as claimed in claim 13," should be
  -- A device to enable selection of menu items from a menu through use of a pointer device, comprising:
    a screen to display the menu items in the menu; and
    a processor to apportion the screen into a plurality of menu fields containing respective ones of the menu items in a first mode, each menu field being larger than an area occupied by display of the respective menu item on the screen, and to enable selection of one of the menu items though the pointing device placing a pointer in the respective menu field, --;

Claim 19,
Line 34, "The device as claimed in claim 13," should be
  -- A device to enable selection of menu items from a menu through use of a menu through use of a pointer device, comprising:

a screen to display the menu items in the menu;
    a processor to apportion the screen into a plurality of menu fields containing respective ones of the menu items in a first mode, each menu field being larger than an area occupied by display of the respective menu item on the screen, and to enable selection of one of the menu items through the pointing device placing a pointer in the respective menu field; and --.

Signed and Sealed this

Twenty-first Day of August, 2001

*Attest:*

Nicholas P. Godici

NICHOLAS P. GODICI
*Attesting Officer*     *Acting Director of the United States Patent and Trademark Office*